United States Patent [19]

Boyd et al.

[11] Patent Number: 4,657,811

[45] Date of Patent: Apr. 14, 1987

[54] HIGH PERFORMANCE THREE LAYER POLYOLEFIN FILM

[75] Inventors: Dana M. Boyd, Rushville; Edward A. Colombo, Fairport, both of N.Y.; William H. Lashway, Pittsfield, Mass.

[73] Assignee: Mobil Oil Corporation, New York, N.Y.

[21] Appl. No.: 737,008

[22] Filed: May 23, 1985

Related U.S. Application Data

[62] Division of Ser. No. 527,933, Aug. 30, 1983, Pat. No. 4,533,578.

[51] Int. Cl.$^4$ .......................... B32B 3/26; B32B 27/08; B32B 27/32; B29C 47/00
[52] U.S. Cl. ................................ 428/318.6; 264/45.9; 264/54; 428/319.9; 428/516
[58] Field of Search ............... 428/304.4, 318.6, 319.7, 428/319.9, 516, 35; 264/45.9, 54

[56] References Cited

U.S. PATENT DOCUMENTS

| | | | |
|---|---|---|---|
| 3,553,070 | 1/1971 | Sparks | 428/319.7 |
| 4,049,147 | 9/1977 | Stiles et al. | 428/318.6 |
| 4,107,247 | 8/1978 | Dukess | 428/319.7 |
| 4,399,173 | 8/1983 | Anthony et al. | 428/516 |

*Primary Examiner*—William J. Van Balen
*Attorney, Agent, or Firm*—Alexander J. McKillop; Michael G. Gilman; Stanislaus Aksman

[57] ABSTRACT

There is provided a three-ply plastic film prepared by a sandwich foam, blown film coextrusion process. The outer skin layers are composed of high performance polyolefins, such as linear low density polyethylene. The foamed middle layer imparts to the film improved structural integrity and stiffness, an independent tear mechanism for the skin layers, and improved TD tear strength.

22 Claims, No Drawings

HIGH PERFORMANCE THREE LAYER POLYOLEFIN FILM

CROSS-REFERENCE TO RELATED APPLICATION

This is a divisional of a U.S. patent application Ser. No. 527,933, filed on Aug. 30, 1983, now U.S. Pat. No. 4,533,578.

BACKGROUND

This invention relates to three-ply trash bags containing skin layers of high performance polyolefin films prepared by a sandwich foam coextrusion process.

Since about 1978, high performance polyolefins, such as linear low density polyethylene polymers, have been available at sufficient cost and quantity to justify their commercial use in trash bags including heavy duty garbage bags, leaf bags and trash can liners. By use of such polymers, bags of remarkably thin gauge and flexibility can be achieved without sacrificing the strength characteristics of thicker gauge bags made from other polymers. However, high performance polyolefin bags of thin overall gauge tend to have a "limp", "flimsy" feel. Accordingly, even though such thin bags may have more than adequate strength for trash containment, the user may refrain from using these bags, because he may be misled by the flimsy feel of the bags. If a bag breaks because of misuse, the user may tend to unjustifiably blame the breakage on the thin nature of the bag.

In addition to having a high degree of strength per unit thickness, bags composed primarily from high performance polyolefins tend to have a high degree of flexibility. These properties present a number of handling problems to the user of the bag. First of all, for example, when the opposing walls of the bag are folded one on the other in the conventional orientation for packaging a number of bags, these walls lack sufficient independent structural integrity to stand alone and tend to conform tightly one to another. Accordingly, it is often difficult to locate the opening of the bag, and, once the opening is located, the opposite walls of the bag often must be peeled apart. Another problem associated with the large degree of flexibility of the walls is that the walls will tend to collapse, e.g., when the bag is held in the open position. More particularly, when one attempts to hold such a flexible bag open by grasping and spreading opposite ends of the opening in an attempt to form a more or less circular configuration, the ungrasped portions of the bag tend to droop in a frustrating fashion. It can be extremely difficult to load trash or leaves in a bag with such a droopy opening.

Even when a circular opening is maintained by using such a light weight flexible trash bag as a trash can liner, problems may still result from excessive flexibility. For example, the bag may tend to fold in on itself instead of conforming to the shape of the trash receptacle. This folding may result in the bag being subjected to excessive destructive forces, e.g., when heavy objects are thrown into the receptacle.

Accordingly, there is a need to impart improved structural properties to trash bag structures having high performance polyolefins.

SUMMARY

According to one aspect of the invention, there is provided a three-ply plastic bag structure suitable for containing trash or garbage, said bag structure comprising:

(i) outermost and innermost skin layers essentially composed of one or more high performance polyolefin resins, said skin layers being of equal or different thickness, said skin layers each having a thickness between about 0.25 and about 0.50 mils; and (ii) a middle foamed thermoplastic layer having a density of at least 25% less than the density of the corresponding unfoamed version of said layer, the thickness of said foamed layer being between about 0.25 and about 1.5 mils.

According to another aspect of the invention, there is provided a method for improving the handleability and strength characteristics of a bag structure containing high performance polyolefin, said method comprising interposing a foamed thermoplastic layer between two high performance polyolefin skin layers by a blown film coextrusion process.

DETAILED DESCRIPTION

The high performance polyolefins suitable for use in accordance with aspects of the present invention include linear low density polyethylenes, linear high density polyethylenes and similar polyolefins having comparable strength characteristics when extruded into blown films. Preferred high performance polyolefins are linear low density polyethylenes. Such linear low density polyethylenes are described in the Anderson et al U.S. Pat. No. 4,076,698, the entire disclosure of which is expressly incorporated herein by reference. Non-linear low density polyolefins, e.g., produced by a high pressure process in the absence of a Ziegler-type catalyst, are expressly excluded as coming under the definition of high performance polyolefins.

The skin layers of the three-ply bag structures in accordance with the present invention are essentially composed of high performance polyolefins. Accordingly, these layers may be composed entirely of the high performance polyolefins or may contain a minor portion, e.g., up to about 25% by weight, of a compatible thermoplastic resin capable of being blended with the high performance polyolefin without substantially reducing the strength characteristics of films extruded therefrom. Such compatible thermoplastic resins include non-linear low density polyethylene, polybutylene, ethylene vinyl acetate copolymers, and polyethylene terephthalate.

The skin layers may be of equal or different thickness. These layers may each have a thickness between about 0.25 and 0.50 mils, more preferably, between about 0.30 and 0.40 mils.

Interposed between the skin layers is a foamed thermoplastic layer. This foamed thermoplastic layer has a density of at least 25% less than the density of the corresponding unfoamed version of the layer. In other terms, the foamed thermoplastic layer should have a void volume of at least 25%, more preferably from about 30% to about 75%. The thickness of the foamed layer may be between about 0.25 and about 1.5 mils, more preferably between about 0.5 and about 1.0 mils.

The thermoplastic layer may be composed of any resin or combination of resins which are capable of being foamed and coextruded with the above-described skin layers. Such resins include the following: linear and non-linear, high and low density, polyethylene; polypropylene; ethylene vinyl acetate copolymers; and polyethylene terephthalate. Preferred resins for the foamed layer include non-linear, low density polyethylenes, especially those particularly adapted for foaming.

The bag structures of the present invention may have an overall thickness of, e.g., about 2.5 mils or less or even about 1.5 mils or less.

The plies of the plastic bag structure of the present invention may be formed in a manner analogous to known manners for forming bag structures which differ from those of the present invention in that they do not contain foamed plies. However, one or more suitable foaming agents may be incorporated into the melt stream corresponding to the foamed ply. Examples of such foaming agents, sufficient foaming amounts of such agents and methods of foaming with such agents are given in the Mixon et al U.S. Pat. No. 3,893,957, the entire disclosure of which is expressly incorporated herein by reference.

An example of a procedure for manufacturing bags is as follows. Polymer melt is extruded (or coextruded) through an annular die forming a tube bounded by pneumatically closed nip rolls on one end and the die face on the other. The tube is inflated by pressurized air flowing through the die and exiting from the die face within the confines of the tube (or bubble, when inflated). The circular bubble is collapsed into a continuous double thickness layflat after encountering collapsing shields and the nip rolls, in that order. After nipping, the layflat feeds over a number of idler rolls and is slit in the midddle to form two separate U-folded layflats. These are fed to a bag machine where a hot seal bar burns through across both webs, simultaneously forming four heat seals, corresponding to two finished bags. The bags exit the bag machine and are individually folded, stacked, and packed in cartons.

EXAMPLE 1

2.61 MIL GAUGE FOAMED THREE-PLY BAG

A 2.61 gauge foamed three-ply bag was prepared as follows. Polymer melt is fed into an 8 inch diameter blown film die forming three coextruded layers in an ABA configuration. The skin (A-A) layers are extruded from a single 2½ inch diameter 30/1 extruder while the B or core layer is provided by a similar 2½ inch diameter 30/1 or a 1½ inch diameter 28/1 extruder. The skin layers contain typically a 0.920 g/cc density, 1.0 melt index LPLLDPE[1] polymer while the core layer consists of a 0.920 g/cc density, 2.0 melt index HPLDPE[2] blended with 3 percent by weight of a pelletized chemical blowing agent[3] which contains 12 percent active azodicarbonamide. The skin layers consist of a throughput of approximately 60 lbs/hr. evenly split between the outer and inner piles and extruded at a melt temperature in the 420°–450° F. range. The core layer is extruded at 25 lbs/hr with a melt temperature of 390°–400° F. A blow up ratio of 2:1 was used and the take off speed is adjusted to obtain the finished thickness required.

[1]Dowlex 2045 ethylene-octene copolymer low pressure linear low density polyethylene
[2]Dow 529 high pressure low density polyethylene resin
[3]Nortech NF1062FA N$^2$ generating azodicarbonamide CBA

COMPARATIVE EXAMPLE A

1.54 MIL GAUGE UNFOAMED THREE-PLY BAG

For the purposes of comparison, the procedure of Example 1 was essentially repeated, except that the foaming agent was omitted from the melt stream corresponding to the center ply. Properties of the Example 1 and Comparative Example A bags are given in Table 1.

TABLE 1

| PROPERTY | | EXAMPLE 1 BAG | COMPARATIVE EXAMPLE A BAG |
|---|---|---|---|
| GAUGE (MILS) | BASIS | 1.48 | 1.54 |
| | FOAMED | 2.61 | — |
| % Δ @ | | −43% | — |
| LB YIELD | MD | 2.68 | 2.28 |
| | TD | 1.99 | 2.43 |
| LB ULT | MD | 4.82 | 5.51 |
| | TD | 3.58 | 4.57 |
| % ELONGATION | MD | 376 | 423 |
| | TD | 617 | 810 |
| TEAR (GMS) | MD | 273 | 169 |
| | TD | 1337 | 464 |

EXAMPLE 2

1.57 MIL GAUGE FOAMED THREE-PLY BAG

The procedure of Example 1 was essentially repeated except that the take-off speed was increased to produce a thinner gauge foamed three-ply bag.

COMPARATIVE EXAMPLE B

1.02 MIL GAUGE UNFOAMED THREE-PLY BAG

For the purposes of comparison, the procedure of Example 2 was essentially repeated, except that the foaming agent was omitted from the melt stream corresponding to the center ply. Properties of the Example 2 and Comparative Example B bags are given in Table 2.

TABLE 2

| | | EXAMPLE 2 BAG | COMPARATIVE EXAMPLE B BAG |
|---|---|---|---|
| GAUGE (MILS) | BASIS | 1.02 | 1.02 |
| | FOAMED | 1.57 | — |
| LBS. YIELD | MD | 1.60 | 1.63 |
| | TD | 1.38 | 1.65 |
| LBS ULTIMATE | MD | 3.40 | 4.33 |
| | TD | 2.50 | 2.89 |
| % ELONGATION | MD | 310 | 412 |
| | TD | 605 | 721 |
| TEAR (GMS) | MD | 99 | 164 |
| | TD | 1013 | 861 |

The bags of Examples 1 and 2 have a much higher degree of stiffness and structural integrity than corresponding bags where the foamed layer is omitted.

Particularly in view of the high degree of foaming in the foamed layers of Examples 1 and 2, and in view of the relatively poor strength properties of non-linear low density polyethylene films, one would expect the strength properties of the three-ply film/foam/film system to be imparted essentially by the skin layers. However, the presence of the foam layer was observed to improve the strength of the skin layers in at least two respects.

First of all, by essentially providing a void space between the skin layers, the foamed sandwich structure was observed to undergo an independent tearing mechanism, whereby the respective skin layers would fail independently. In other terms, when the three-ply system was subjected to tearing forces, one skin layer could bear the brunt of these forces and tear, the other skin layer being insulated from these forces by the foam layer, such that the tearing forces would not be substantially transferred from one skin layer to the other. On the other hand, the non-foamed system of the Comparative Examples was not observed to undergo such an independent tearing mechanism. Both skin layers of the non-foamed system failed at once, the unfoamed innermost layer apparently being incapable of insulating one skin layer from forces subjected to the other.

A particularly unexpected result achieved by means of interposing a foamed layer between the skin layers in Examples 1 and 2 was the improvement in TD tear strength.

Although the Example 2 structure shows a decrease in MD tear strength in comparison with the Comparative Example B structure, this decrease is felt to be attributable to presence of elongated void spaces in the foam layer of the Example 2 structure. Accordingly, the MD tear strength of the Example 2 structure could be improved by optimizing the foaming conditions to produce a larger number of less elongated voids.

The present invention may comprise, consist essentially of, or consist of the elements or method steps described herein.

What is claimed is:

1. A three-ply plastic film comprising:
   (i) outermost and innermost skin layers manufactured from linear low density polyethylene or linear high density polyethylene, said skin layers being of equal or different thickness, said skin layers each having a thickness of between about 0.25 and about 0.50 mils; and
   (ii) a middle foamed thermoplastic layer having a density of at least 25% less than the density of the corresponding unfoamed version of said layer, the thickness of said foamed layer being between about 0.25 and about 1.5 mils, the film exhibiting an independent tearing mechanism for each of the skin layers and substantially improved TD tear strength as compared to a substantially identical comparative three-ply plastic film comprising outermost and innermost skin layers manufactured from linear low density polyethylene or linear high density polyethylene and a middle non-foamed thermoplastic layer.

2. A three-ply plastic film of claim 1 having an overall thickness of 2.5 mils or less.

3. A three-ply plastic film of claim 2 having an overall thickness of 1.5 mils or less.

4. A three-ply plastic film of claim 3, wherein said skin layers each have a thickness of between about 0.30 and 0.40 mils.

5. A three-ply plastic film of claim 4, wherein said foamed layer has a thickness of between about 0.5 and 1.0 mils.

6. A three-ply plastic film of claim 5, wherein said foamed layer has a void volume of between about 30% and about 75%.

7. A three-ply plastic film of claim 6 wherein said foamed thermoplastic layer is manufactured from a material selected from the group consisting of linear high density polyethylene, linear low density polyethylene, non-linear high density polyethylene, non-linear low density polyethylene, polypropylene, polybutylene, ethylene vinyl acetate copolymers and polyethylene terephthalate.

8. A three-ply plastic film of claim 7 wherein said foamed thermoplastic layer is manufactured from non-linear low density polyethylene.

9. A three-ply plastic film of claim 8 wherein said skin layers are manufactured from linear low density polyethylene.

10. A method for improving the handleability and strength characteristics of a plastic film containing high performance polyolefin comprising interposing a foamed thermoplastic layer between two high performance polyolefin skin layers by a blown film coextrusion process, thereby forming a three-ply plastic film comprised of:
    (i) outermost and innermost skin layers manufactured from linear low density polyethylene or linear high density polyethylene, said skin layers being of equal or different thickness, said skin layers each having a thickness of between about 0.25 and about 0.50 mils; and
    (ii) a middle foamed thermoplastic layer having a density of at least 25% less than the density of the corresponding unfoamed version of said layer, the thickness of said foamed layer being between about 0.25 and about 1.5 mils.

11. A method of claim 10, wherein said three-ply plastic film has an overall thickness of 2.5 mils or less.

12. A method of claim 11, wherein said three-ply plastic film has an overall thickness of 1.5 mils or less.

13. A method of claim 12, wherein each of said skin layers has a thickness of between about 0.30 and about 0.40 mils.

14. A method of claim 13, wherein said foamed layer has a thickness of between about 0.5 and 1.0 mils.

15. A method of claim 14, wherein said foamed layer has a void volume of between about 30% and about 75%.

16. A method of claim 15 wherein said foamed thermoplastic layer is manufactured from a material selected from the group consisting of linear high density polyethylene, linear low density polyethylene, non-linear high density polyethylene, non-linear low density polyethylene, polypropylene, polybutylene, ethylene vinyl acetate copolymers and polyethylene terephthalate.

17. A method of claim 16 wherein said foamed thermoplastic layer is manufactured from non-linear low density polyethylene.

18. A method of claim 17 wherein said skin layers are manufactured from linear low density polyethylene.

19. A three-ply plastic film of claim 9 having a thickness of 2.61 mils wherein the two skin layers are manufactured from low pressure linear low density polyethylene of 0.920 g/cc density and melt index of 1.0, and the middle layer is manufactured from high pressure polyethylene of 0.920 g/cc density and melt index of 2.0.

20. A three-ply plastic film of claim 9 having a thickness of 1.57 mils wherein the two skin layers are manufactured from low pressure linear low density polyethylene of 0.920 g/cc density and melt index of 1.0, and the middle layer is manufactured from high pressure polyethylene of 0.920 g/cc density and melt index of 2.0.

21. A method of claim 18 wherein the three-ply plastic film has a thickness of 2.61 mils and the two skin layers are manufactured from low pressure linear low density polyethylene of 0.920 g/cc density and melt index of 1.0, and the middle layer is manufactured from high pressure polyethylene of 0.920 g/cc density and melt index of 2.0.

22. A method of claim 18 wherein the three-ply plastic film has a thickness of 1.57 mils and the two skin layers are manufactured from low pressure linear low density polyethylene of 0.290 g/cc density and melt index of 1.0, and the middle layer is manufactured from high pressure polyethylene of 0.920 g/cc density and melt index of 2.0.

* * * * *

UNITED STATES PATENT AND TRADEMARK OFFICE
CERTIFICATE OF CORRECTION

PATENT NO. : 4,657,811

DATED : April 14, 1987

INVENTOR(S) : Dana M. Boyd, Edward A. Colombo & William H. Lashway

It is certified that error appears in the above-identified patent and that said Letters Patent is hereby corrected as shown below:

Column 6, line 64, delete "0.290" and insert --0.920--.

Signed and Sealed this

Sixth Day of June, 1989

Attest:

DONALD J. QUIGG

Attesting Officer

Commissioner of Patents and Trademarks